(12) United States Patent
Ohara

(10) Patent No.: US 7,398,018 B2
(45) Date of Patent: Jul. 8, 2008

(54) OPTICAL TRANSMISSION EQUIPMENT

(75) Inventor: Katsuichi Ohara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 10/268,184

(22) Filed: Oct. 10, 2002

(65) Prior Publication Data
US 2004/0208510 A1  Oct. 21, 2004

(30) Foreign Application Priority Data
Mar. 18, 2002  (JP)  ............................. 2002-073512

(51) Int. Cl.
*H04B 10/00* (2006.01)
(52) U.S. Cl. ........................................... 398/5; 398/55
(58) Field of Classification Search ...................... 398/2, 398/4, 5, 55, 83, 84, 85
See application file for complete search history.

(56) References Cited

U.S. PATENT DOCUMENTS

| | | | |
|---|---|---|---|
| 4,527,270 A * | 7/1985 | Sweeton | 714/47 |
| 6,816,680 B2 * | 11/2004 | Purse et al. | 398/5 |
| 2001/0003484 A1 * | 6/2001 | Fujita | 359/110 |
| 2003/0172319 A1 * | 9/2003 | Ryhorchuk et al. | 714/27 |

FOREIGN PATENT DOCUMENTS

| | | |
|---|---|---|
| JP | 58-140701 | 8/1983 |
| JP | 2000-115132 | 4/2000 |
| JP | 2000-224079 | 8/2000 |

\* cited by examiner

*Primary Examiner*—Christina Y Leung
(74) *Attorney, Agent, or Firm*—Katten Muchin Rosenman LLP

(57) ABSTRACT

An optical transmission equipment having a switchover control function of optical transmission lines enables to reduce a required space in a common equipment supervision and control portion. The optical transmission equipment includes a pair of a work interface unit and a protection interface unit each accommodating an optical transmission line, and an add drop multiplexing unit for selecting an optical signal output from either of the interface unit pair. Each interface unit includes a switchover controller, and each of the interface unit pair is mutually connected via a communication path so as to share status information among the switchover controllers. Upon a failure in the work interface unit side of the interface unit pair, the failure is reported to the protection interface unit side prepared as an object for switchover, to send a switchover request from the protection interface unit side to the add drop multiplexing unit.

4 Claims, 6 Drawing Sheets

OPTICAL TRANSMISSION EQUIPMENT

FIELD OF THE INVENTION

The present invention relates to optical transmission equipment having switch control of optical transmission lines.

BACKGROUND OF THE INVENTION

In optical transmission equipment, transmission lines are redundantly configured to improve availability. Examples of such a redundant configuration are shown in FIGS. 1 to 3.

FIG. 1 shows an exemplary configuration of optical transmission equipment incorporating switch control of an optical transmission line to switch over between a work line and a protection line constituted on a 1:1 configuration basis. The optical transmission equipment accommodates a plurality of optical transmission lines 1, 2 . . . n in an add drop multiplexing unit (hereinafter referred to as ADM unit) 10 via corresponding interface units IF1, IF2 . . . IFn.

Each interface unit IF1, IF2 . . . IFn is provided with a pair of interface units IF1-1 and IF1-2 so as to accommodate a pair of transmission lines constituting a work line (W) and a protection line (P).

The optical transmission equipment further includes an equipment supervision and control portion 20. This equipment supervision and control portion 20 has a switchover controller 21. An alarm signal (APS) is transmitted and received to/from other optical transmission equipment through interface units IF1, IF2 . . . IFn. Equipment supervision and control portion 20 receives a switchover trigger signal SWTRG when either a line failure is detected by interface units IF1, IF2 . . . IFn or a hardware failure is detected in the transmission and reception portion of interface unit IF.

Meanwhile, in ADM unit 10, switchover units 11-1 to 11-n (which are selectors for selectively switching over from a work line to a protection line related to a certain interface unit) are provided corresponding to a plurality of optical transmission lines 1, 2 . . . n for switching work and protection lines.

Each switchover unit 11-1 to 11-n switches interface units corresponding to a work line and a protection line according to a switchover command SWCMD which is generated by switchover controller 21 based on a switchover trigger signal SWTRG from interface unit IF1, IF2 . . . IFn.

In FIG. 2, there is shown a configuration example of optical transmission equipment having built-in switchover control of work/protection optical transmission lines being provided on a 1:N basis. In this configuration example, one transmission line among a plurality (n+1) of optical transmission lines is reserved for a protection line. This protection line is switched over to work state when a failure occurs on a work line.

For this purpose, ADM unit 10 provides one switchover unit 11 (in this example, a selector to switch from a failed work interface to a protection interface), to switch the interface units corresponding to the work/protection transmission lines in response to a switchover command SWCMD sent from switchover controller 21.

FIG. 3 shows a conventional BLSR (bi-directional line switched ring) switchover configuration being allocated on a ring transmission line. Switchover controller 21 in equipment supervision and control portion 20 controls switchover unit pairs (here, circuits for either bridging or switching) 11-1, 11-2 . . . 11-n in ADM unit 10 corresponding to each plurality of transmission lines based on a switchover trigger signal SWTRG from interface units IF1, IF2 . . . IFn.

In such a conventional configuration of a redundant control system, it is essential to provide switchover controller 21 as a control unit separately provided from switchover units 11, 11-1 . . . 11-n in ADM unit 10. Therefore, it is required to prepare a space for switchover controller 21.

Also, when the number of the aforementioned switchover unit pair 11-1 to 11-n becomes larger, a control unit 21 must be divided into separate units from the viewpoint of performance, which further requires additional space.

Therefore, it is to be assumed to provide control unit 21 independently of the switchover unit corresponding to each transmission line. However, in such a configuration, normal switchover to the protection side cannot be guaranteed on occurrence of a failure in an independent control unit itself. In addition, it is necessary to evaluate a status of the protection side prior to the switchover.

SUMMARY OF THE INVENTION

Accordingly, it is an object of the present invention to provide optical transmission equipment having a switchover control function of optical transmission lines which enables to reduce a required space in a common equipment supervision and control portion, to derive switchover performance to the full extent and to implement a large scale system.

In order to attain the above-mentioned object, as a first embodiment of the present invention, optical transmission equipment includes a pair of a work interface unit and a protection interface unit each accommodating an optical transmission line, and an add drop multiplexing unit for selecting an optical signal being output from either of the interface unit pair to output. Each interface unit of the interface unit pair has a switchover controller, and each of the interface unit pair is mutually connected via a communication path so as to share status information among the switchover controllers. On occurrence of a failure in the work interface unit side of the interface unit pair, the failure is reported via the communication path to the protection interface unit side prepared as an object for switchover, to send a switchover request from the protection interface unit side to the add drop multiplexing unit.

As a second embodiment of the present invention to attain the aforementioned object, in the first embodiment of the optical transmission equipment, the add drop multiplexing unit is constituted by a selector by which an output from either the work interface unit or the protection interface unit is made effective.

As a third embodiment of the present invention to attain the aforementioned object, in the second embodiment of the optical transmission equipment, the add drop multiplexing unit comprises a priority circuit for assigning priority to an output from the work interface unit side of the interface unit pair. When switchover requests are sent from both the work and protection interface unit pair, a switchover request sent from the work interface unit to which the priority is assigned is made effective.

As a fourth embodiment of the present invention, optical transmission equipment includes (n+1) interface units each accommodating each of (n+1) optical transmission lines, and an add drop multiplexing unit for selecting optical signals being output from n work interface units among (n+1) interface units to output. Each interface unit of the (n+1) interface units comprises a switchover controller, and the (n+1) interface units are mutually connected via a communication path so as to share status information among the switchover controllers. On occurrence of a failure in a work interface unit among the (n+1) interface units, the failure is reported via the communication path to one protection interface unit prepared as an object for switchover, to send a switchover request from the protection interface unit to the add drop multiplexing unit.

As a fifth embodiment of the present invention to attain the aforementioned object, in the fourth embodiment of the optical transmission equipment, the add drop multiplexing unit is a selector for making an output of one protection interface unit being prepared as an object for switchover effective in place of an output of the failed work interface unit.

As a sixth embodiment of the present invention to attain the aforementioned object, in the fifth embodiment of the optical transmission equipment, the add drop multiplexing unit comprises a priority circuit for assigning the lowest priority to an output of one protection interface unit among (n+1) interface units and successively assigning higher priority to outputs of the other n work interface units, so as to make a switchover to an output of the protection interface unit effective in order of priority assigned in the priority circuit.

As a seventh embodiment of the present invention to attain the aforementioned object, optical transmission equipment includes a pair of interface units each accommodating a ring-shaped optical transmission line, and an add drop multiplexing unit having a switchover unit corresponding to the interface unit pair for either looping back an optical signal being output from one interface unit of the interface unit pair to the other interface unit, or bridging the optical signal to the other interface unit. Each interface unit of the interface unit pair has a switchover controller, and each of the interface unit pair is mutually connected via a communication path so as to share status information among the switchover controller. On occurrence of a failure in one interface unit side of the interface unit pair, the failure is reported via the communication path to the other interface unit side prepared as an object for switchover, to send a switchover request for either looping back to the other interface unit or bridging from the protection interface unit side to the add drop multiplexing unit.

Further scopes and features of the present invention will become more apparent by the following description of the embodiments with the accompanied drawings.

DETAILED DESCRIPTION OF THE PREFERRED EMBODIMENTS

The preferred embodiment of the present invention is described hereinafter referring to the charts and drawings.

Figure 1:
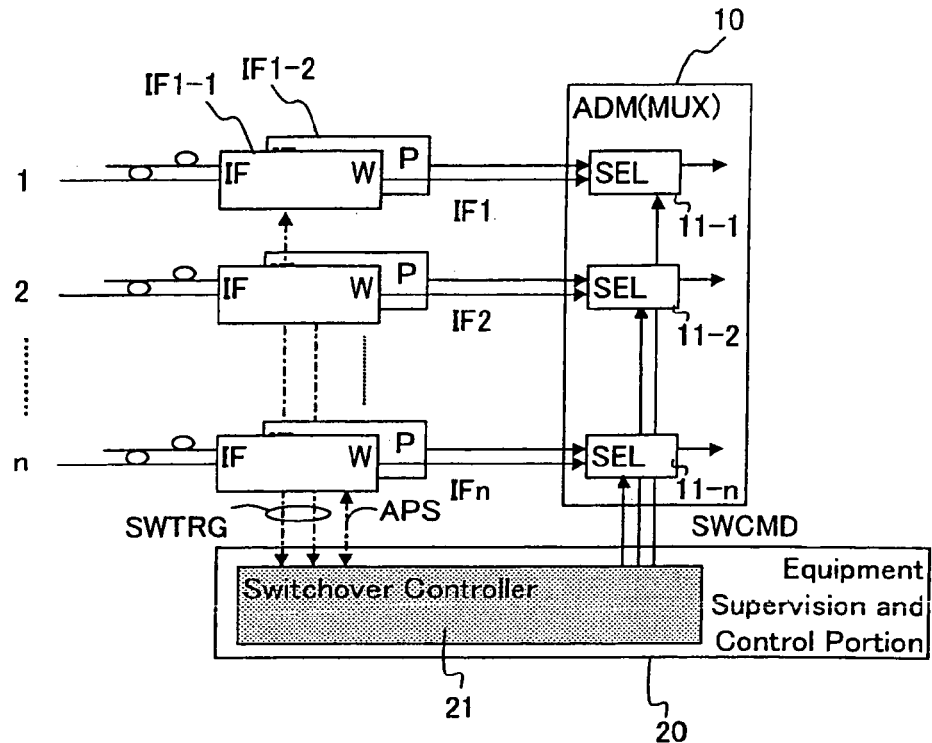
FIG. 1 shows a configuration example of optical transmission equipment in which switchover control is adopted to switch a work line and a protection line on a 1:1 basis.
Figure 4:
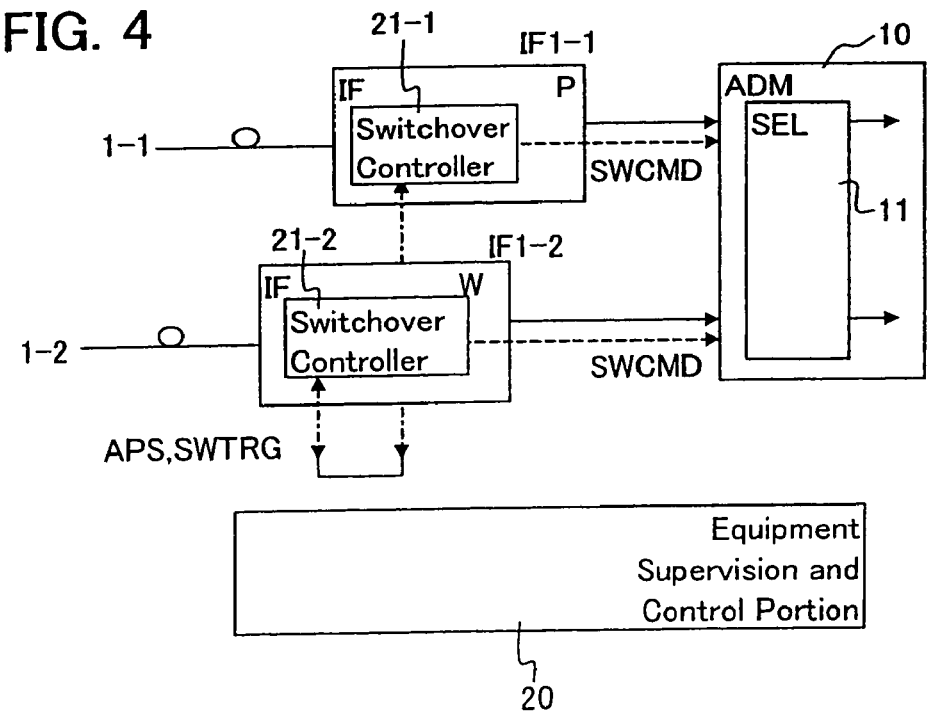
FIG. 4 shows an embodiment of the present invention corresponding to the 1:1 redundant configuration shown in FIG. 1.

FIG. 4 shows an embodiment example according to the present invention corresponding to the 1:1 redundant configuration shown in FIG. 1. In FIG. 4, for the sake of easy understanding, there is shown a configuration of only one pair of transmission lines 1-1, 1-2 respectively acting as a work line and a protection line.

Switchover controllers 21-1, 21-2 are incorporated in respective interface unit pair IF1-1, IF1-2 corresponding to transmission line pair 1-1, 1-2. Information is interchanged between these switchover controllers 21-1, 21-2 so as to share the information.

In an ADM unit 10, a switchover unit 11 is provided corresponding to one pair of transmission lines 1-1, 1-2. This switchover unit 11 switches the outputs of interface units IF1-1, IF1-2 based on a switchover command (SWCMD) issued from switchover controllers 21-1, 21-2, thus performing a line switchover between the work line and the protection line.

Here, according to the standard specification, the time required for line switchover must be no more than 50 milliseconds (msec). In the configuration shown in FIG. 1, the object of switchover in each switchover unit 11 is fixed to one pair of work and protection lines. It is therefore always possible to make a switchover within 50 msec of the specified standard switchover time. Also, in case a plurality of lines are accommodated in a unit, the number of lines is small compared to the number of lines concentrated in a system. When switchover becomes not possible because of a failed switchover controller, the number of lines to which switchover is impeded can be reduced.

Figure 2:
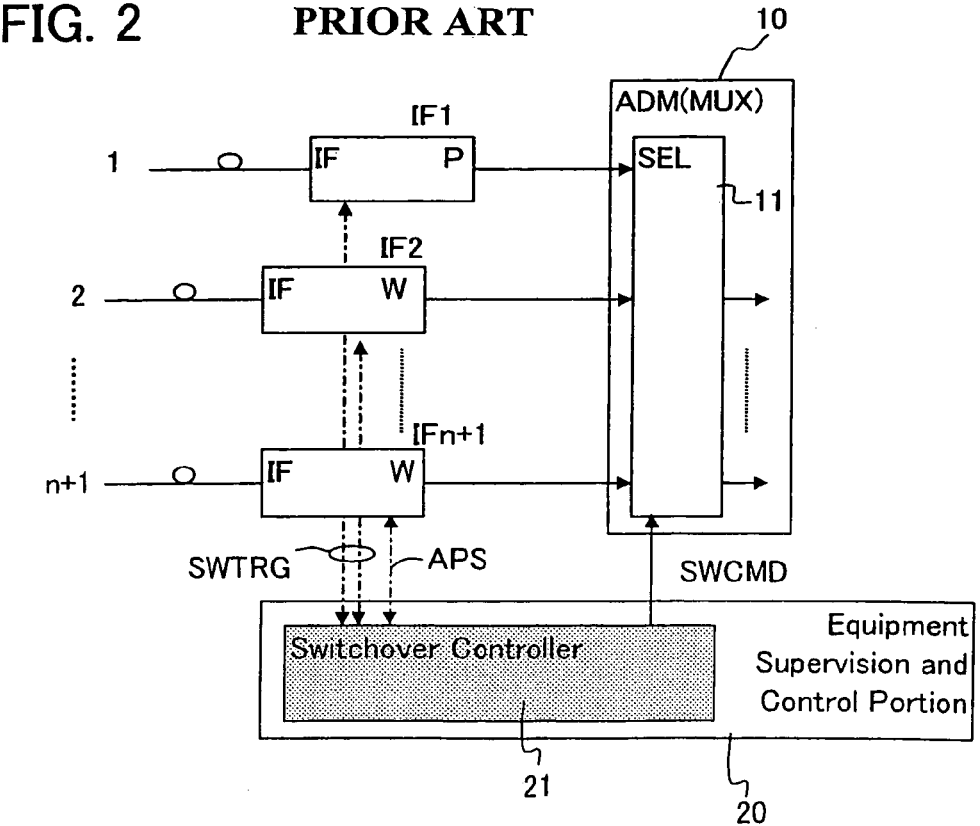
FIG. 2 shows a configuration example of optical transmission equipment in which switchover control is adopted to switch a work line and a protection line on a 1:N basis.
Figure 5:
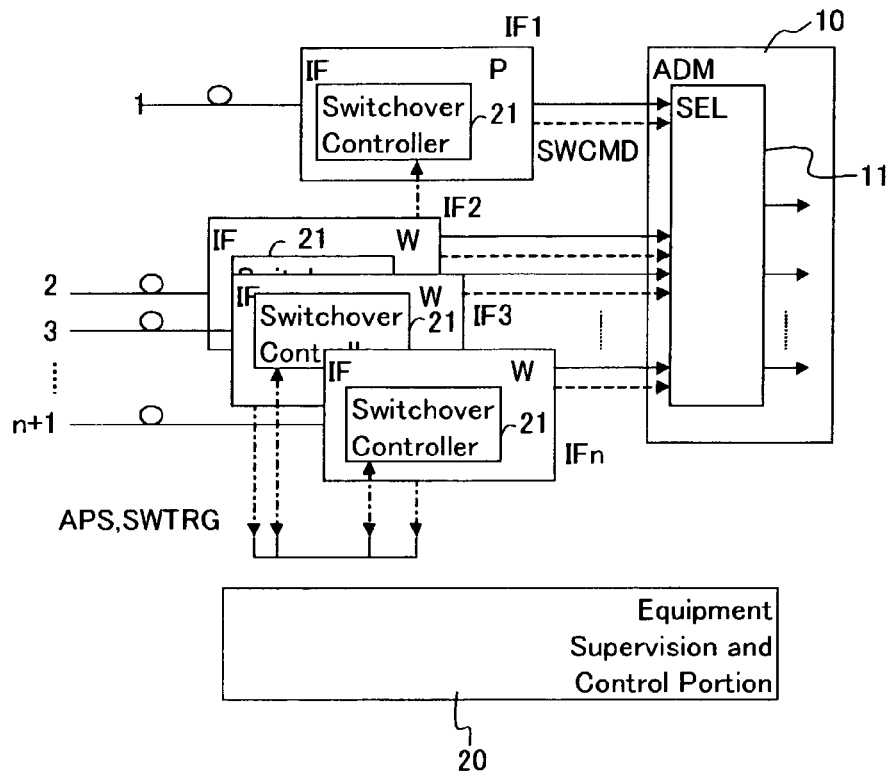
FIG. 5 shows an embodiment of the present invention corresponding to a 1:N redundant configuration shown in FIG. 2.

FIG. 5 is an embodiment of the present invention corresponding to the 1:N configuration shown in FIG. 2. In this FIG. 5, switchover controller 21 is built in corresponding to each of the (1+n) interface units IF1 to IF(1+n).

Also in this configuration, mutual information exchange is carried out so as to share information between each interface unit IF1 to IF(n+1). In such a configuration shown in FIG. 5, it is possible to switch interface output between a work line and a protection line with in a switchover time of 50 msec as specified in the standard. The reason is that the switchover performed by switchover unit 11 is always fixed against 1:N pairs or the number of lines per interface is small.

Figure 3:
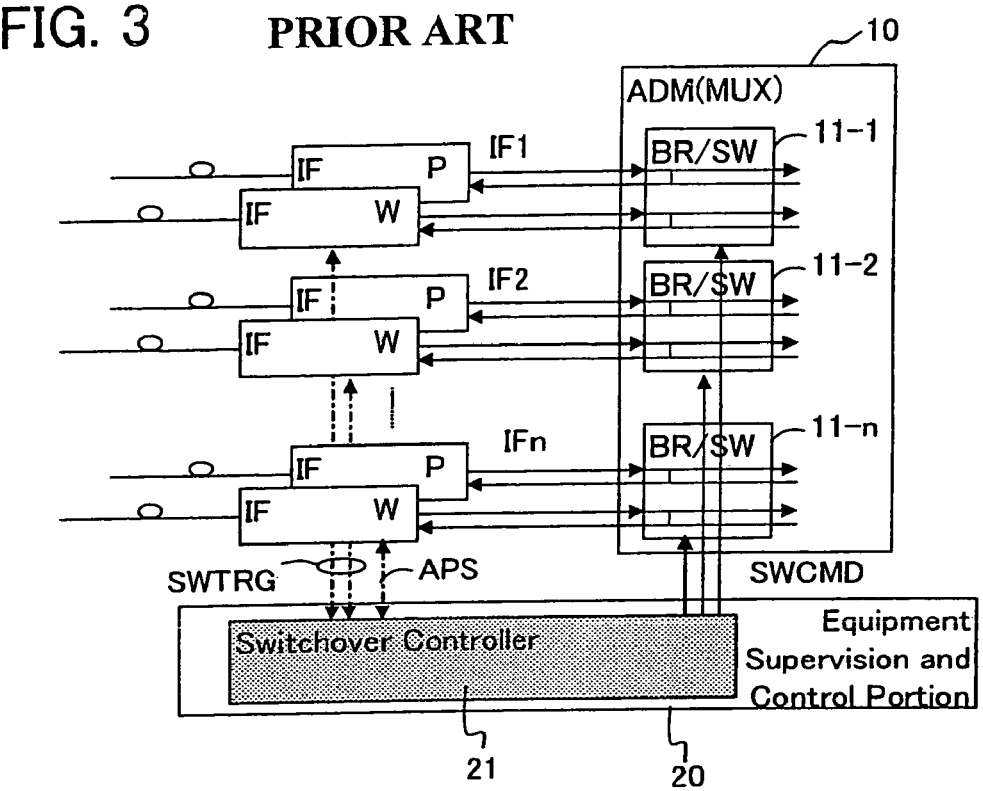
FIG. 3 shows a conventional BLSR switchover configuration disposed in a ring-shaped transmission line.
Figure 6:
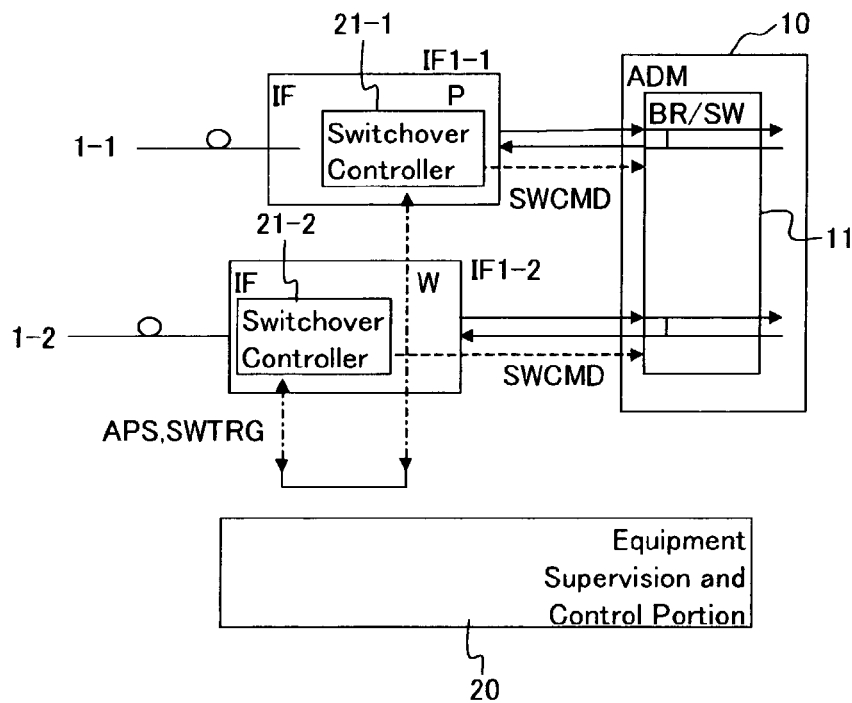
FIG. 6 shows an embodiment of the present invention corresponding to a BLSR configuration shown in FIG. 3.

FIG. 6 shows an embodiment of the present invention corresponding to a BLSR (bi-directional line switched ring) configuration shown in FIG. 3. For the sake of easy understanding, only a configuration corresponding to a work/protection pair of duplicated transmission lines 1-1, 1-2 is shown in FIG. 6. In each interface unit pair IF1-1, IF1-2 respectively corresponding to the pair of duplicated transmission lines 1-1, 1-2, switchover controllers 21-1, 21-2 are built in, to communicate so as to share information therebetween.

ADM unit 10 provides a switchover unit 11 so as to correspond to a pair of duplicated transmission lines 1-1, 1-2. Based on a switchover command (SWCMD) from switchover controllers 21-1, 21-2 in interface units IF1-1, IF1-2, switchover unit 11 switches one failed transmission line among the duplicated transmission lines 1-1, 1-2 so as to loop signals back to the other transmission line. Thus continuity of communication is maintained.

In such a BLSR configuration, it is possible to switch interface output within a specified standard switchover time 50 msec because a BLSR pair of the duplicated transmission lines 1-1, 1-2 to be controlled is always fixed or the number of lines per unit is small.

Figure 7:
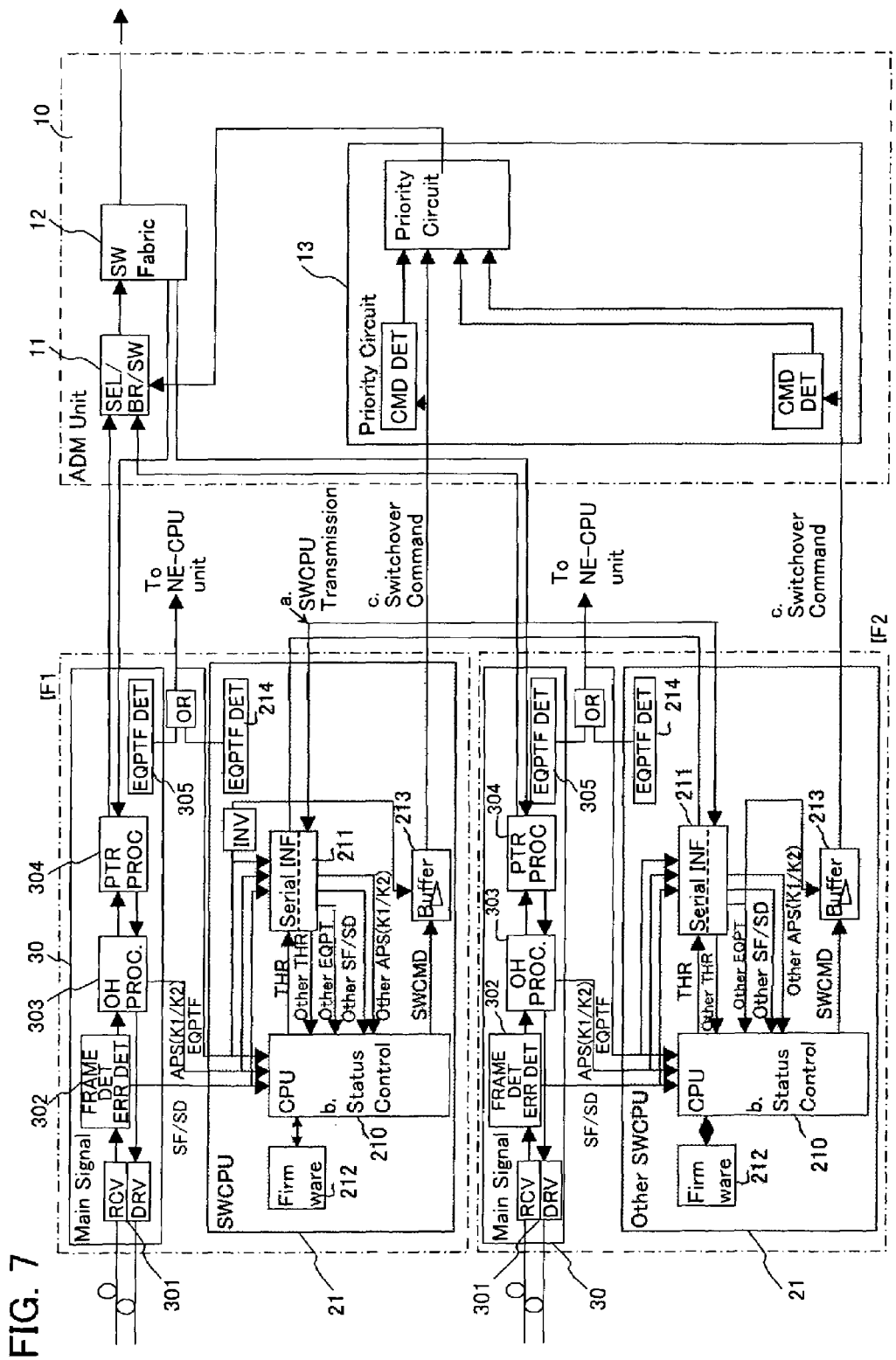
FIG. 7 shows a block diagram illustrating a detailed configuration according to the present invention shown in FIGS. 4 to 6.

FIG. 7 shows a block diagram of a detailed configuration of transmission equipment to implement an embodiment of the present invention shown in FIGS. 4 to 6. In this figure, for the sake of simplification, only ADM unit 10, a pair of interface units IF1 and interface unit IF2 are shown, as other configurations are identical. Interface units IF1, IF2 includes a main signal processor 30 and a switchover controller 21.

Main signal processor 30 includes a signal transmission/reception circuit 301, a frame/line error detection circuit 302, an overhead add drop multiplexing circuit 303 and a pointer control circuit 304.

In frame/line error detection circuit 302, a signal failure SF and a signal quality deterioration SD caused by a line error is detected to output. Overhead add drop multiplexing circuit 303 detects an APS condition from K1/K2 byte in a signal overhead part to output.

Switchover controller 21 includes a CPU 210 for performing status control and a serial signal interface 211 for signal transmission and reception between an interface unit pair IF1, IF2. Further, the work/protection switchover operation according to the present invention is performed by firmware 212 to control CPU 210.

Meanwhile, ADM unit 10 includes a switchover unit (signal selector/bridge/switchover circuit) 11, a route selection circuit 12 and a priority circuit 13.

Figure 8:
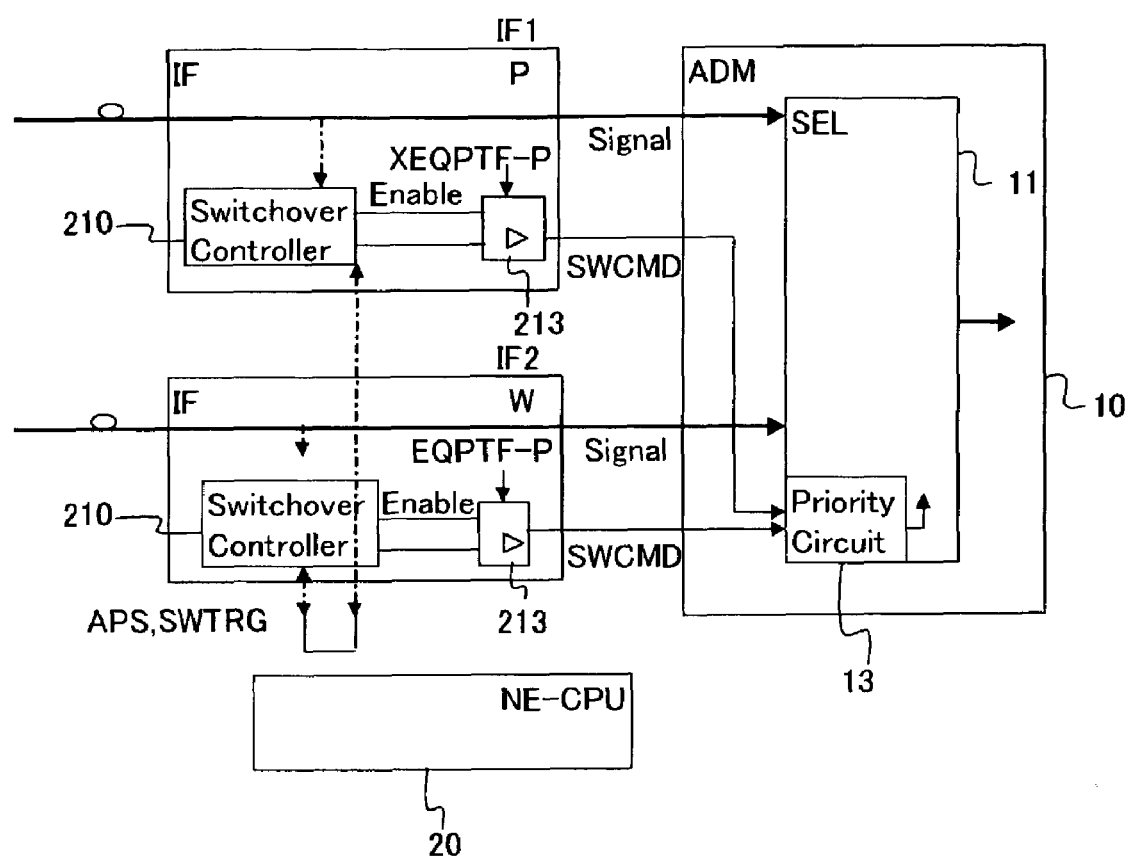
FIG. 8 shows a schematic diagram of the detailed configuration shown in FIG. 7.
Figure 9:
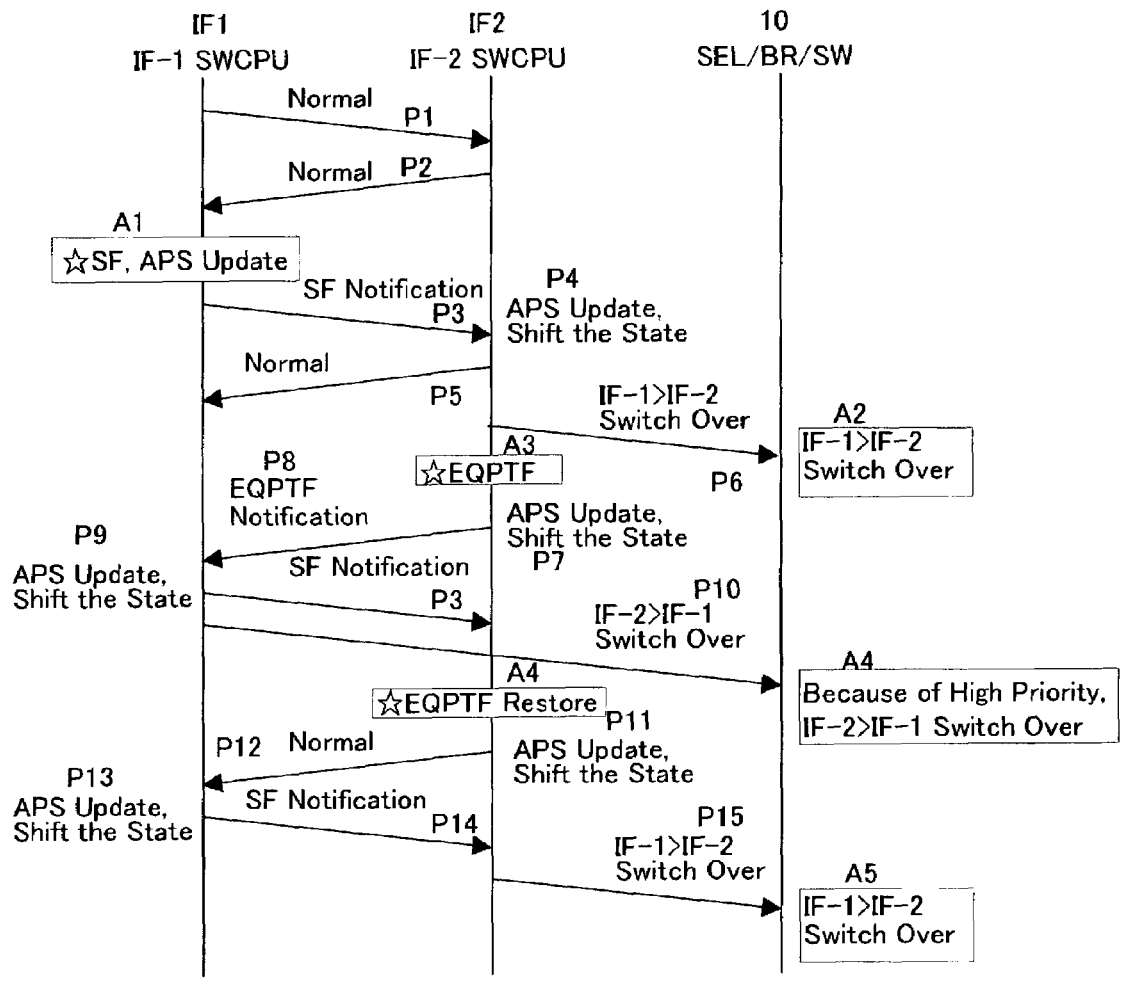
FIG. 9 shows an operation flowchart in the configuration shown in FIG. 7 (FIG. 8).
Figure 10:
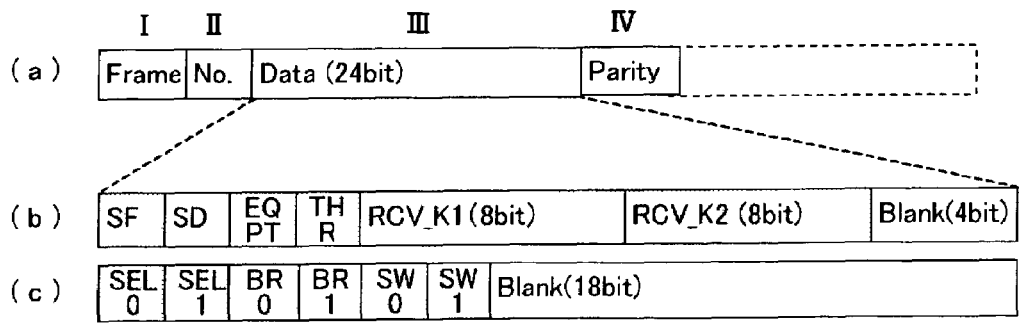
FIG. 10 shows a diagram illustrating a control signal configuration to incorporate the present invention.

In such a configuration, an operation is illustrated hereafter. For the sake of easy understanding, a detailed configuration shown in FIG. 7 is schematically shown in FIG. 8. In this FIG. 8, identical reference numbers to the numbers shown in FIG. 7 are assigned to the blocks corresponding to the functions shown in FIG. 7. FIG. 9 shows an operation flow of the circuit shown in FIG. 7 (FIG. 8). Further, FIG. 10 is a diagram illustrating a control signal frame structure to implement the present invention. Hereafter a switchover operation of the present invention is illustrated referring to the aforementioned diagrams.

Referring to FIG. 9, the 1:1 redundant configuration is assumed in the following explanation.

In a normal state, a pair of interface units IF1, IF2 mutually informs each other of the normal condition through serial signal interface circuit 211 (procedures P1, P2).

Here, an exemplary signal format for use in the mutual information exchange between the interface units as well as in a switchover command to be issued to ADM unit 10 is constituted as shown in FIG. 10. As frame signal (a), there are provided frame synchronization signal I, frame number II, data III consisting of, for example, 24 bits, and parity bit IV.

In this procedure, when a signal failure SF and signal quality deterioration SD caused by a line error are detected and output (A1) in frame/line error detection circuit 302 of one interface unit IF1, APS (automatic protection switching) protocol is updated in CPU 210 to inform the other interface unit IF2 of the signal failure (SF) notification through serial signal interface circuit 211 (procedure P3).

This signal failure (SF) notification (b) is performed by data III constituted in the aforementioned frame signal (a), as shown in FIG. 10(b). Namely, in the configuration of data III shown in FIG. 10(b), SD denotes signal quality deterioration, EQT denotes a equipment failure, THR denotes a signal path/non-path notification to be dedicatedly used for BLSR, RCVK1 denotes a status report from the equipment located on the opposite side, and RCVK2 denotes a response signal against a signal K1 transmitted from the own equipment indicating a switchover state of the equipment on the opposite side. Here, the above-stated THR in signal format (b) becomes effective in case of BLSR.

The other interface unit IF2 updates APS according to a signal failure notification from interface unit IF1 (procedure P3), to shift the status from the protection side to the work side (procedure P4).

At this time, interface unit IF2 reports to interface unit IF1 that interface unit IF2 stays in normal condition (procedure P5). Moreover, interface unit IF2 transmits to ADM unit 10 a request for switching over from interface unit IF1 to interface unit IF2 (procedure P6).

The switchover request is constituted by frame signal data III having a format shown in FIG. 10(c). In the signal format shown in FIG. 10(c), SEL0 and SEL1 are switchover commands for use in either 1:1 or 1:N redundant configuration. Either SEL0 or SEL1 is defined effective and the corresponding interface unit is selected in ADM unit 10. In addition, BR0, BR1, SW0 and SW1 in the signal format shown in FIG. 10(c) are flags for use in the BLSR configuration shown in FIG. 6.

Referring back to FIG. 9, on receiving the report of normal condition from interface unit IF2 (procedure P5), interface unit IF1 disables a command line including a buffer amplifier 213 so as not to issue a switchover request from the own interface unit IF1.

Accordingly, based on the switchover request having the signal format shown in FIG. 10(c) issued by interface unit IF2 (procedure P6), switchover unit 11 in ADM unit 10 is controlled so that an output from interface unit IF2 becomes effective (A2).

Here, it is assumed in FIG. 9 that an equipment failure occurs in interface unit IF2 having been acting as a work side (A3) after the aforementioned switchover is completed (A2). In FIG. 7, the equipment failure is detected by both an equipment failure detector 305 provided in main signal processor 30 and an equipment failure detector 214 provided in switchover controller 21.

At this time, interface unit IF2 updates APS to shift the status to the protection side (procedure P7) and sends the equipment failure notification to interface unit IF1 via equipment supervision and control portion 20 (procedure P8). When the switchover interface unit controller in interface unit IF2 becomes faulty, interface unit IF2 cannot shift the own state. However, it is possible to achieve the switchover by sending an equipment failure notification from interface unit IF2 to interface unit IF1 prepared for switchover.

Based on this notification, interface unit IF1 updates APS to shift the state to the work side (procedure P9), and requests ADM unit 10 to switch over from interface unit IF2 to interface unit IF1 (procedure P10).

In response to this notification, by setting high priority in priority circuit 13 of ADM unit 10 against the switchover request from interface unit IF1, switchover unit 11 is controlled so that the effective output side is to be switched over from interface unit IF2 to interface unit IF1, irrespective of the switchover request issued from interface unit IF2.

Further, in FIG. 9, when equipment failure of interface unit IF2 is restored (A4), interface unit IF2 updates APS to shift the state to the work side (procedure P11), and reports normal condition information to interface unit IF1 (procedure P12).

When interface unit IF1 receives this normal condition information from interface unit IF2, interface unit IF1 updates APS to shift the state to the protection side (procedure P13). At this time, because the normal condition information is received from interface unit IF2, no switchover request is issued from interface unit IF1.

Meanwhile, in interface unit IF1, because the state of signal failure (SF) occurrence remains unchanged, SF notification (procedure P3) is sent to interface unit IF2 (procedure P14). Accordingly, a switchover request which requests to switch over to interface unit IF2 is sent from interface unit IF1 to ADM unit 10 (procedure P15).

Thus, the switchover from interface unit IF1 to interface unit IF2 is performed (A5).

Although the above-mentioned description illustrates a switchover operation in the 1:1 redundant configuration, the basic configuration is identical in 1:N redundant configuration excluding a part of the operation resulting from a plurality of work interface units.

More specifically, it is required to share information in the entire interface units IF1 to IFn. For this reason, it is necessary that switchover controller 21 sends information to all interface units but itself successively after storing the entire information, not only bridging information to switchover controller 21 in the interface unit located on the opposite side.

In addition, in priority circuit 13 of ADM unit 10, the priority is set successively to the plurality of interface units so that the interface unit on the protection side is allocated to the lowest priority. With this method, the same switchover operation can be performed in the same way as shown in FIG. 9.

Furthermore, in the BLSR configuration, the same switchover control as the aforementioned 1:1 redundant configuration is carried out except for protection by either signal bridging control or signal loop-back control.

As can be understood from the above description of the embodiment according to the accompanied drawings, according to the present invention, it becomes unnecessary to provide a concentrated switchover controller, which brings about guaranteeing switchover and performance without occupying too much common space.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. Optical transmission equipment comprising:
a pair of a work interface unit and a protection interface unit each accommodating an optical transmission line; and
an add drop multiplexing unit commonly provided for the pair of a work interface unit and a protection interface unit, for selecting between respective optical signals being output from said interface unit pair to output either selected optical signal,
wherein each interface unit of said interface unit pair includes a switchover controller, and each of said interface unit pair is mutually connected via a communication path so as to share status information among said switchover controllers,
on occurrence of a failure in said work interface unit of said interface unit pair, said switchover controller of the work interface unit reports the failure via said communication path to said switchover controller of the protection interface unit prepared as an object for switchover, and then, the switchover controller of the protection interface unit sends a switchover request to the add drop multiplexing unit, thereby selecting the signal output from the protection interface unit, and
wherein the add drop multiplexing unit includes a priority circuit in which high priority is set for a switchover request from the work interface unit, so that an effective out put side is to be switched over from the protection interface unit to the work interface unit, irrespective of the switchover request issued from in the protection interface unit.

2. The optical transmission equipment according to claim 1,
wherein said add drop multiplexing unit is a selector by which an output from either said work interface unit or said protection interface unit is made effective.

3. The optical transmission equipment according to claim 2,
wherein when switchover requests are sent from both said work and protection interface unit pair, a switchover request sent from said work interface unit to which said priority is assigned is made effective.

4. Optical transmission equipment comprising:
a pair of interface units each accommodating a ring-shaped optical transmission line; and
an add drop multiplexing unit provided commonly for the pair of interface units, and having a switchover unit corresponding to said interface unit pair for either looping back an optical signal being output from one interface unit of said interface unit pair to the other interface unit, or bridging said optical signal to the other interface unit,
wherein each interface unit of said interface unit pair includes a switchover controller, and each of said interface unit pair is mutually connected via a communication path so as to share status information among said switchover controllers,
on occurrence of a failure in one interface unit of said interface unit pair, said one interface unit reports the failure via said communication path to the other interface unit prepared as an object for switchover, and then, the other interface unit sends a switchover request for either looping back to said other interface unit or bridging from the other interface unit to said add drop multiplexing unit, thereby selecting the signal output from the other interface unit, and
the add drop multiplexing unit includes a priority circuit in which high priority is set for a switchover request from the one interface unit, so than an effective output side is to be switched over from the other interface unit to the one interface unit, irrespective of the switchover request issued from in the other interface unit.

* * * * *